United States Patent Office 3,131,204
Patented Apr. 28, 1964

3,131,204
NOVEL DIQUATERNARY AMINOPHOSPHONIUM
COMPOUNDS
Harry H. Sisler and Nathan L. Smith, Gainesville, Fla.,
assignors to W. R. Grace & Co., New York, N.Y., a
corporation of Connecticut
No Drawing. Filed Feb. 9, 1962, Ser. No. 172,088
9 Claims. (Cl. 260—448.2)

The present invention relates to the production of substituted aminophosphonium compounds, and more specifically to a novel method for synthesizing aminophosphonium compounds, and to new substituted aminophosphonium compounds obtainable thereby.

In a copending application, Serial No. 154,063, filed November 21, 1961, by W. T. Barrett and assigned to the same assignee as the present case, substituted aminophosphonium halides having the general formula:

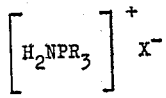

wherein R represents organic radicals and X represents halogen, are disclosed as being highly effective lead scavengers and anti-oxidants added to gasoline and lubricating oils.

The aminophosphonium halides disclosed in the copending application, Serial No. 764,531 are prepared by reacting chloramine with the substituted phosphines by way of a reaction which may be illustrated as:

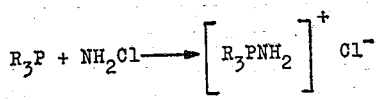

wherein R has the same meaning as given previously.

It is obvious from the above that the use of chloramine yields aminophosphonium halides having no organic substituents attached to the nitrogen atom of the molecule, and organic substitution is necessarily restricted to the phosphorus atom. Therefore, it may be seen that a synthesis route, other than that offered by chloramine, must be used if aminophosphonium compounds are to be obtained having organic substituents both on the nitrogen and phosphorus atoms.

It is therefore an object of the present invention to provide novel substituted aminophosphonium compounds.

It is another object of the present invention to provide substituted aminophosphonium compounds having organic substituents located on both the phosphorus and nitrogen molecules thereof.

It is yet another object of the invention to provide a novel method of synthesizing substituted aminophosphonium compounds which may have organic substituents on both the phosphorus and nitrogen atoms thereof or if preferred, having organic substituents on the phosphorus atom alone.

It is yet a further object of the invention to provide a method for synthesizing substituted aminophosphorium compounds and of a diquaternary nature.

These and still further objects of the present invention will become readily apparent to those skilled in the art from the following detailed description and specific examples.

In general, the present invention involves the quaternization and diquaternization of aminophosphines by organic halides.

More specifically, the present invention contemplates novel aminophosphonium compounds which may be represented by the following general formula:

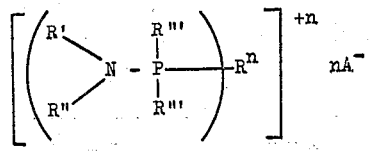

wherein
R' represents a wide variety of radicals including hydrogen; alkyl having 1 to 18 contiguous carbon atoms; alkenyl having 2 to 18 contiguous carbon atoms and from 1 to 3 ethylenic bonds; phenyl; napthenyl; alkylphenyl having 1 to 3 alkyl substituents of 1 to 6 contiguous carbon atoms; cycloalkyl having 3 to 6 members; alkylene amine having alkylene chains of from 1 to 18 contiguous carbon atoms; heterocyclic amine having 3 to 6 members and from 1 to 2 amino groups; carboxyamide; and P,P-disubstituted-N, alkylene phosphinamide, said P substituents being alkyl having 1 to 18 contiguous carbon atoms, alkenyl having 2 to 18 carbon atoms and from 1 to 3 ethylenic bonds and phenyl, and said N-substituted alkylene radical having 2 to 18 contiguous carbon atoms.

R" may be chosen from substantially the same group of radicals as R' except for hydrogen.

Furthermore, the present invention contemplates compounds of the above general formula wherein R' and R" are replaced or taken together as a single divalent radical such as alkylene having 2 to 6 contiguous carbon atoms; dialkylene ether having alkylene substituents of 2 to 4 contiguous carbon atoms each; dialkylene amine wherein the alkylene radicals have 2 to 4 contiguous carbon atoms each; and P,P-disubstituted N,N-dialkylene phosphinamide wherein said P substituents may be alkyl having 1 to 18 contiguous carbon atoms, alkenyl having 1 to 18 carbon atoms and from 1 to 3 ethylenic bonds, and phenyl, and said N substituted alkylene radical having 2 to 18 contiguous carbon atoms. When R' and R" are combined as a single divalent radical, it is seen that the phosphorus bonded nitrogen atom forms part of a heterocyclic ring therewith.

R''' may be a radical such as alkyl having 1 to 18 contiguous carbon atoms; alkenyl having 2 to 18 carbon atoms and 1 to 3 ethylenic bonds; phenyl, and substituted phenyl having substitutents which do not interfere with the reaction such as alllkyl having 1 to 6 carbon atoms, and halogen.

R is a monovalent or divalent radical (as indicated by the value of $n$) which may be selected from the group which includes alkyl having 1 to 18 contiguous carbon atoms; phenyl alkyl, said alkyl radical having 1 to 6 contiguous carbon atoms; diphenyl alkyl, said alkyl radical having 1 to 6 carbon atoms, mono- and di-halogenated phenyl alkyl; phenyl diazonium; halogen substituted triazinyl; triazinyl; alkylene having 1 to 10 contiguous carbon atoms; alkenylene having 2 to 10 contiguous carbon atoms; aryl dialkylene, the alkylene substituents of which have 1 to 3 contiguous carbon atoms; and the aryl group being phenylene and anthracenylene; dialkylene ether having alkylene substituents of from 2 to 4 carbon atoms; and dialkylene alkyl siloxyl, wherein the alkylene and alkyl substituents have 1 to 4 carbon atoms.

In the above general formula, $n$ is an integer having a value of from 1 to 2. A is an anion and may be halogen, which includes chlorine, bromine, iodine or fluorine; borohydride; picrate; and hexafluorophosphate.

The compounds contemplated in the present invention are prepared by a novel method in which an aminophosphine is quaternized with an organic halide in the presence of an appropriate solvent. The overall reaction may be typically illustrated as occurring as follows:

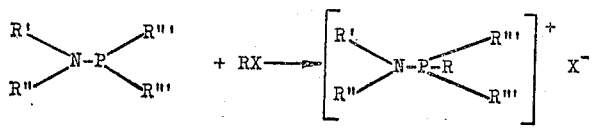

or, in the case wherein a dihalogenated organic halide is employed and diquaternization takes place,

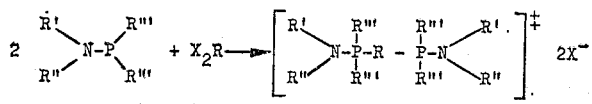

where R', R", R''', R and X have the same meaning as given above.

In the novel compounds identified above it is seen that at least one of the nitrogen substituents R' and R" is an organic radical. It should be understood, however, that by selecting an aminophosphine having only hydrogen substituents on the nitrogen atom both R' and R" could be hydrogen and the aminophosphonium halides disclosed in application, Serial No. 154,063 would be obtained. It is seen that the presently intended method of synthesis not only provides a means for obtaining the new compounds disclosed herein, it also provides a method for obtaining compounds previously disclosed in the art.

The reaction used to prepare the presently contemplated aminophosphonium halides is best carried out in the presence of an inert solvent under anhydrous conditions. Suitable solvents are dimethylformamide, benzene, toluene, xylene, ethyl ether and so forth. In the preparation of the present compounds heating of a reaction mixture containing the aminophosphine, halohydrocarbon and solvent sufficient to maintain a reflux of the solvent at atmospheric pressure is all that is normally required to induce and maintain the desired reaction. Reaction temperatures from about 35° to about 200° C., depending on the boiling point of the solvent used, are generally preferred. The process is, however, not limited to this temperature range and the reaction will proceed at any temperature in which the system may be kept in the liquid phase. The time required for the reaction to reach completion is dependent on the temperature and the specific reactants used. However, refluxing the reaction mixture for a period from 4 to 20 hours is usually sufficient.

The aminophosphonium cations as initially obtained in the practice of the present invention are associated with the halide anion which is displaced from the quaternizing agent used during the reaction. This halide anion may be conveniently replaced by other anions such as borohydride, picrate, and hexafluorophosphate by using conventional metathetical procedures wherein a solution of aminophosphonium halide is added to a saturated solution of a salt of the desired anion. In many cases the aminophosphonium compound in combination with the desired anion will precipitate from solution and may be recovered by simple filtration.

The aminophosphines which are used as intermediates in the preparation of the intended compounds are disclosed in the copending application, Serial No. 129,194, filed June 22, 1961, by H. H. Sisler and N. L. Smith and assigned to the same assignee as the present case. Briefly, the aminophosphine intermediates utilized in the present invention may be readily obtained by reacting a substituted halophosphine with a primary or secondary amine or ammonia in accordance with the following reaction:

R₂PX + 2NR₂H → R₂PNR₂ + NR₂H·HX where R may be hydrogen or an organic substituent and X is halogen.

Having broadly described the present invention the following specific examples are set forth as specific embodiments thereof.

*Example I*

A solution of 12.8 g. (0.05 mole) of tertiarybutyl-aminodiphenylphosphine dissolved in 100 ml. of dry benzene was added to a solution of 4.5 g. (0.025 moles) of ω,ω'-dichloro-p-xylene in 150 ml. of dry benzene. The mixture was stirred under reflux at atmospheric pressure for 5 hours, cooled and filtered. A white powdery product weighing 2.1 g. was obtained. The product was found to melt with decomposition at a temperature of 269° C. Infrared data and elemental analysis confirmed existence of a compound having the structure:

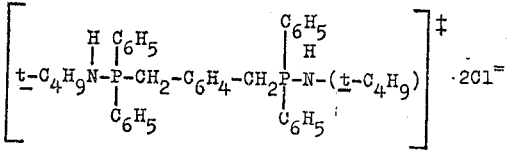

P-xylene-bis-(t-butylaminodiphenylphosphonium chloride)

*Example II*

A solution of redistilled benzylchloride (1.3 g. or 0.01 mole), tertiarybutylaminodiphenylphosphine (6.2 g. or 0.01 mole) and 7.0 ml. of sodium-dried ethyl ether were stirred under gentle reflux for 5 hours. The solvent was removed by vacuum leaving a yellow viscid liquid. On standing overnight white crystals separated. The mixture was filtered and the solids washed with ethyl ether and dried. The product weighed 1.7 g. and represented a 44% yield. The melting point was 247° C. The infrared and elemental analysis of the product indicate a compound having the following structure was obtained:

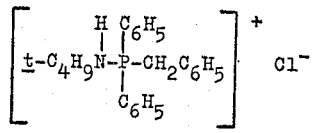

P-(t-butylamino)-P,P,P-benzyldiphenylphosphonium chloride

*Example III*

Treating a benzene solution of tertiarybutylaminodiphenylphosphine with a benzene solution of methyl iodide results in the separation of fine white crystals having a melting point of 198.5 to 200° C. The infrared and analytical data indicate the compound:

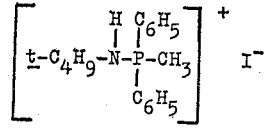

P-(t-butylamino)-P,P,P-methyldiphenylphosphonium iodide

*Example IV*

A stirred solution of 2.0 g. (0.01 moles) of 2,4-dichlorobenzylchloride and 2.5 g. (0.01 mole) of t-butylaminodiphenylphosphine in toluene was heated at reflux for 16 hours. The volume of the mixture was reduced to half by rotary evaporation resulting in the deposition of a white powder. This product was filtered and washed twice with ethyl ether. The addition of ethyl ether to the filtrate caused the separation of an additional quantity. The combined crude product was crystallized from ethanol as white granules, M.P. 268° (dec.). It weighed 3.2 g. (46% yield). The product is somewhat soluble in water and crystallized in white granules, M.P. 271° (dec.).

The structure of the aminophosphonium chloride was confirmed by infrared and analytical data.

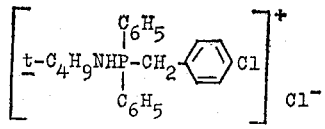

(2,4-dichlorobenzyl)-t-butylaminodiphenylphosphonium chloride

Example V

A solution of 5.4 g. (0.02 mole) of N-methylbutylaminodiphenylphosphine and 1.8 g. (0.01 mole) of p-xylene dichloride in 65 ml. of dimethylformamide was heated at reflux with stirring for 20 hours. The product was cooled and filtered. The solid was washed twice with ethyl ether and then vacuum-dried, M.P. 322–324°. It weighed 1.8 g.

The analytical results were indicative of the following structure:

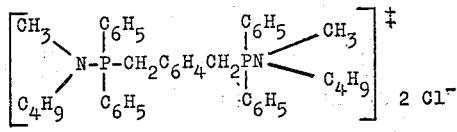

P-xylene-bis(N-methylbutylaminodiphenylphosphonium chloride)

Example VI

To a solution of 5.2 g. (0.02 mole) of t-butylaminodiphenylphosphine in 35 ml. of dimethylformamide was added with stirring a solution of 2.3 g. (0.01 mole) of B,B-′dibromodiethyl ether in 3.4 ml. of benzene. The resultant mixture was refluxed for 16 hours. After cooling, the mixture was filtered, and the solids washed twice with ethyl ether. Two crystallizations from hot water gave white granules which melted with decomposition at 278° C. The product weighed 3.2 g. and represents a 50% yield.

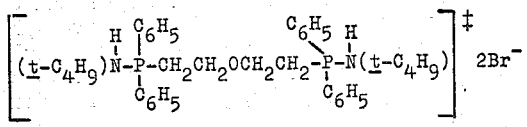

P-B,B′-ethyl-bis(t-butylaminodiphenylphosphonium bromide)

Example VII

To a solution of 5.2 g. (0.02 mole) of t-butylaminodiphenylphosphine in 2.5 ml. of dimethylformamide was added with stirring a solution of 2.5 g. (0.01 mole) of p-bis(chloromethyl) durene. The mixture was stirred at reflux for 12 hours. The product was then filtered and the solids washed twice with ethyl ether. The product weighed 3.9 g. and represents a 52% yield. It melted with decomposition at 295° C.

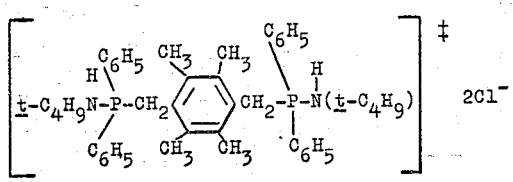

P-(p-tetramethylxylene)-bis(t-butylaminodiphenylphosphonium chloride)

Example VIII

A mixture of 5.2 g. (0.02 mole) of t-butylaminodiphenylphosphine and 58.0 g. (0.2 mole) of methylene iodide was stirred at 40–50° C. for 30 hours and then allowed to stand for a week. The product (2.2 g.) melted at 252–255° C.

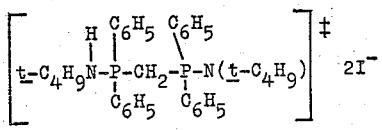

P-methylene-bis(t-butylaminodiphenylphosphonium chloride)

Example IX

A solution of cyanuric trichloride (3.7 g., 0.02 mole) in 45 ml. of chloroform was added with stirring to a solution of 5.2 g. (0.02 mole) of t-butylaminodiphenylphosphine in 30 ml. of chloroform. A noticeable temperature rise took place and the solution turned cloudy. The mixture was allowed to stand overnight (protected from moisture). The crystalline product was filtered and washed twice with ethyl ether. The product melted with decomposition at 45° C. and is very deliquescent.

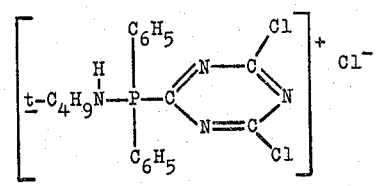

P-(dichloro-s-triazine)-t-butylaminodiphenylphosphonium chloride

Example X

A solution of 15.0 g. (0.1 mole) of p-fluorobenzyl chloride and 26.0 g. (1.0 mole) of t-butylaminodiphenylphosphine in 150 ml. of toluene was stirred at reflux for 14 hours. The mixture was then allowed to cool to room temperature. The colorless crystalline product was filtered, washed twice with ethyl ether and dried. The product weighed 17.0 g. (41% yield) and melted at 227–230° C.

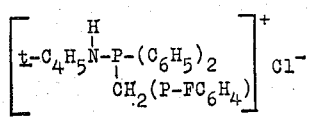

P-(p-fluorobenzyl-t-butylamino)diphenylphosphonium chloride

Example XI

A solution of 5.2 g. (0.02 mole) of t-butylaminodiphenylphosphine in 25 ml. of sodium-dried benzene was added with stirring to a solution of 2.2 g. (0.02 mole) of 1,4-dibromobutene-2 in 25 ml. of dry benzene. The mixture was stirred at reflux for 3 hours. After cooling, the solvent was decanted from the gummy product. The resultant residue was dissolved in ethanol, the solution treated with Nuchar and Celite, and filtered. The white crystalline product which separated was filtered and washed twice with acetone. It weighed 3.9 g. (54% yield) and melted with decomposition at 129° C. The product dissolved in carbon tetrachloride, decolorized a 3% bromine solution in carbon tetrachloride.

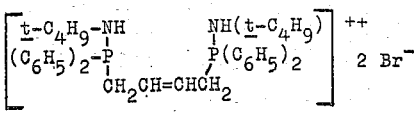

P-(1,4-butene-2)-bis[(t-butylamino)diphenylphosphonium bromide]

Example XII

A solution of 3.2 g. (0.01 mole) of bis(bromoethyl)tetramethyldisiloxane in 25 ml. of benzene was added with stirring to a solution of 5.2 g. (0.02 mole) of t-butylaminodiphenylphosphine in 25 ml. of benzene. The reaction mixture was stirred at reflux for 6.5 hours. After cooling, the solvent was removed at reduced pressure. The product crystallized from methanol-ethyl ether on long standing. It melted with decomposition at 205° C. The crude product weighed 2.5 g. (30% yield).

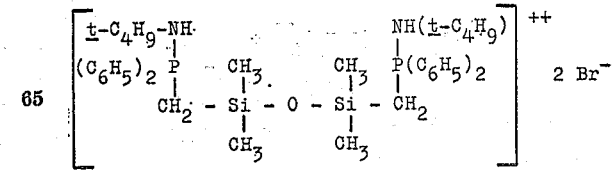

P-(hexamethyldisiloxane)-bis[(t-butylamino)diphenylphosphonium bromide]

Example XIII

A solution of 5.2 g. (0.02 mole) of the t-butylaminodiphenylphosphine in 15 ml. of dimethylformamide was added with stirring to a mixture of 9,10(chloromethyl)anthracene in 20 ml. of dimethylformamide. This mixture was stirred while the temperature was gradually raised to reflux. Near the reflux temperature the reaction mixture was brought into solution and almost immediately a yellow precipitate separated. Stirring at reflux was continued for 1 hour. After standing overnight, the product was filtered and the solids washed three times with ethyl ether. The yellow powder melted with decomposition at 279° C. and weighed 6.5 g. (82% yield).

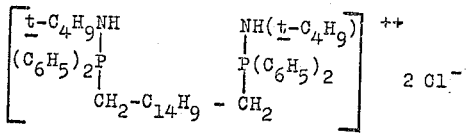

P-(9,10-anthracenedimethyl)-bis[(t-butylamino)diphenylphosphonium chloride]

*Example XIV*

To a cold solution of 2.0 g. (5 mmole) of P-t-butylamino)benzyldiphenylphosphonium chloride in 50 ml. of distilled water was added, with stirring, a solution of 0.3 g. (5 mmole) of potassium borohydride in 25 ml. of distilled water. The product crystallized immediately. Stirring was continued for 0.5 hour. The resultant product was filtered and the solids washed twice with water and dried in vacuo. The white powder melted with decomposition at 167° C. and weighed 1.8 g. (quantitative yield).

The product hydrolyzed in ethanol to give white needles, M.P. 191–192° C. The infrared spectrum of this compound was identical to an authentic sample of benzyldiphenylphosphine oxide, M.P. 191–192° C.

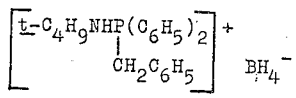

P-(t-butylamino)benzyldiphenylphosphonium borohydride

*Example XV*

A solution of 0.4 g. (1 mmole) of P-(t-butylamino) benzyldiphenylphosphonium chloride in 10 ml. of ethanol was added with stirring to 5 ml. of a saturated ethanolic solution of picric acid. An immediate yellow precipitate formed. The mixture was filtered and dried in air. The crude product weighed 0.5 g. (essentially quantitative yield). It crystallized from ethanol in yellow needles which melted with decomposition at 104° C.

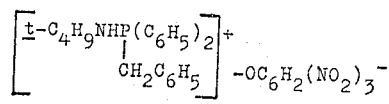

P-(t-butylamino)benzyldiphenylphosphonium picrate

*Example XVI*

In a qualitative experiment, an aqueous solution of P-(t-butylamino)benzyldiphenylphosphonium chloride was added with stirring to an aqueous solution of potassium hexafluorophosphate. A granular precipitate of the aminophosphonium hexafluorophosphate formed immediately. The precipitate was washed with water and dried in air. It melted at 139–140° C.

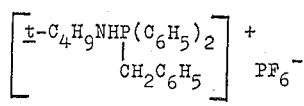

P-(t-butylamino)benzyldiphenylphosphonium hexafluorophosphate

The presently disclosed compounds are useful as lead scavengers and antioxidants for gasolines and lubricating oils. They also possess characteristics which render them useful as plant growth retardants, nematocides and polymer intermediates.

The present case is a continuation-in-part of our prior application Serial No. 118,759, filed June 22, 1961, now abandoned.

We claim:

1. An aminophosphonium compound of the formula

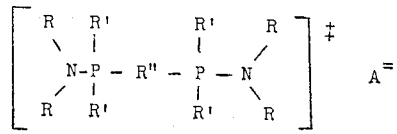

wherein R is selected from the group consisting of hydrogen, alkyl having 1 to 18 carbon atoms, and phenyl; R' is selected from the group consisting of alkyl having 1 to 18 carbon atoms, and phenyl; R'' is selected from the group consisting of alkylene having 1 to 18 carbon atoms, alkenylene having 2 to 20 carbon atoms, phenylene, alkylene-benzene-alkylene wherein the alkylene substituents possess 1 to 3 carbon atoms, alkyleneanthracealkylene wherein the alkylene substituents possess 1 to 3 carbon atoms, alkylenealkylbenzenealkylene wherein the alkylene substituents possess 1 to 3 carbon atoms and the alkyl substituents possess 1 to 4 carbon atoms, alkylenealkylsiloxyalkylene, wherein the alkylene substituents possess 1 to 4 carbon atoms and the alkyl substituents possess 1 to 4 carbon atoms, and alkyleneoxyalkylene wherein the alkylene substituents possess 2 to 4 carbon atoms; and A is an anion selected from the group consisting of halide, borohydride, picrate, and hexafluorophosphate.

2. The compound P-xylene-bis-(t-butylaminodiphenylphosphonium chloride).

3. The compound P-xylene-bis (N-methylbutylaminodiphenylphosphonium chloride).

4. The compound P-B,B'-ethyl ether-bis(t-butylamino diphenylphosphonium bromide).

5. The compound P-(p-tetramethylxylene) - bis - (t-butyl aminodiphenylphosphonium chloride).

6. The compound P-methylene-bis(t - butylaminodiphenylphosphonium chloride).

7. The compound P-(1,4-butene-2) - bis[(t - butylamino)diphenylphosphonium bromide].

8. The compound P - (hexamethyldisiloxane) - bis [(t-butylamino)diphenylphosphonium bromide].

9. The compound P - (9,10 - anthracenedimethyl)-bis-[(t-butylamino)diphenylphosphonium chloride].

References Cited in the file of this patent

UNITED STATES PATENTS 2,934,564    Burg et al. _____ Apr. 26, 1960

OTHER REFERENCES

Michaelis et al.: "Chemische Berichte," vol. 15, pp. 801–804 (1882), QD 1 D4.

Campbell et al.: "Journal of Organic Chemistry," vol. 24, pp. 1246–1251 (1959), QD 241 J6.

Sisler et al.: "Journal of the American Chem. Soc.," vol. 81, pp. 2982–2985 (1959), QD1 A5.

Burg et al.: "Journal of the American Chemical Society," vol. 80, 1958, pages 1107–1109.

Burg et al.: "Journal of the American Chemical Society," vol. 82, 1960, pages 2148–2151.